United States Patent
Kurimoto et al.

(10) Patent No.: US 9,342,043 B2
(45) Date of Patent: May 17, 2016

(54) UNIT ASSEMBLY AND IMAGE FORMING APPARATUS

(71) Applicant: Sharp Kabushiki Kaisha, Osaka (JP)

(72) Inventors: Naoaki Kurimoto, Osaka (JP); Kuniaki Nakano, Osaka (JP); Hiroshi Kubota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/416,399

(22) PCT Filed: Jul. 25, 2013

(86) PCT No.: PCT/JP2013/070161
§ 371 (c)(1),
(2) Date: Jan. 22, 2015

(87) PCT Pub. No.: WO2014/021183
PCT Pub. Date: Feb. 6, 2014

(65) Prior Publication Data
US 2015/0205249 A1   Jul. 23, 2015

(30) Foreign Application Priority Data

Aug. 1, 2012   (JP) ................................. 2012-170815
Aug. 1, 2012   (JP) ................................. 2012-170816
Aug. 1, 2012   (JP) ................................. 2012-170817

(51) Int. Cl.
*G03G 21/16* (2006.01)
*G03G 15/01* (2006.01)
(Continued)

(52) U.S. Cl.
CPC .......... *G03G 21/168* (2013.01); *G03G 15/0189* (2013.01); *G03G 21/1647* (2013.01); *G03G 21/1661* (2013.01); *G03G 21/1676* (2013.01); *G03G 21/1842* (2013.01); *G06K 15/14* (2013.01)

(58) Field of Classification Search
CPC .......... G03G 21/1661; G03G 21/1647; G03G 21/168
See application file for complete search history.

(56) References Cited

U.S. PATENT DOCUMENTS

| | | | |
|---|---|---|---|
| 2002/0031369 A1* | 3/2002 | Tokutake et al. | 399/110 |
| 2006/0067734 A1* | 3/2006 | Igarashi et al. | 399/119 |
| 2007/0146826 A1 | 6/2007 | Inao et al. | |

(Continued)

FOREIGN PATENT DOCUMENTS

| | | |
|---|---|---|
| JP | 09-304994 A | 11/1997 |
| JP | 2002-318478 A | 10/2002 |

(Continued)

OTHER PUBLICATIONS

International Search Report for corresponding International Application No. PCT/JP2013/070161 mailed Oct. 29, 2013.

*Primary Examiner* — Sandra Brase

(74) *Attorney, Agent, or Firm* — Renner, Otto, Boisselle & Sklar, LLP

(57) ABSTRACT

A unit assembly (10) is provided with an image forming unit (20) and an intermediate transfer unit (40), and is configured to be capable of being inserted into and removed from an apparatus body (110). The image forming unit (20) has first processing units (200A to 200D), developing units (4A to 4D), a positioning portion, and a link member (80). The positioning portion is provided in each of the developing units (4A to 4D) and determines the mutual relative positions of the developing units (4A to 4D). The link member (80) links the developing units (4A to 4D) to each other. The intermediate transfer unit (40) is held by the image forming unit (20).

24 Claims, 16 Drawing Sheets

(51) Int. Cl.
　　　*G03G 21/18*　　(2006.01)
　　　*G06K 15/14*　　(2006.01)

(56) References Cited

U.S. PATENT DOCUMENTS

2009/0324275 A1* 12/2009 Okabe .......................... 399/90
2010/0209140 A1* 8/2010 Kamimura et al. ........... 399/111

FOREIGN PATENT DOCUMENTS

| JP | 2003-140432 | * | 5/2003 |
| JP | 2003-140432 A | | 5/2003 |
| JP | 2007-086384 A | | 4/2007 |
| JP | 2007-171799 A | | 7/2007 |
| JP | 2010-091994 A | | 4/2010 |

* cited by examiner

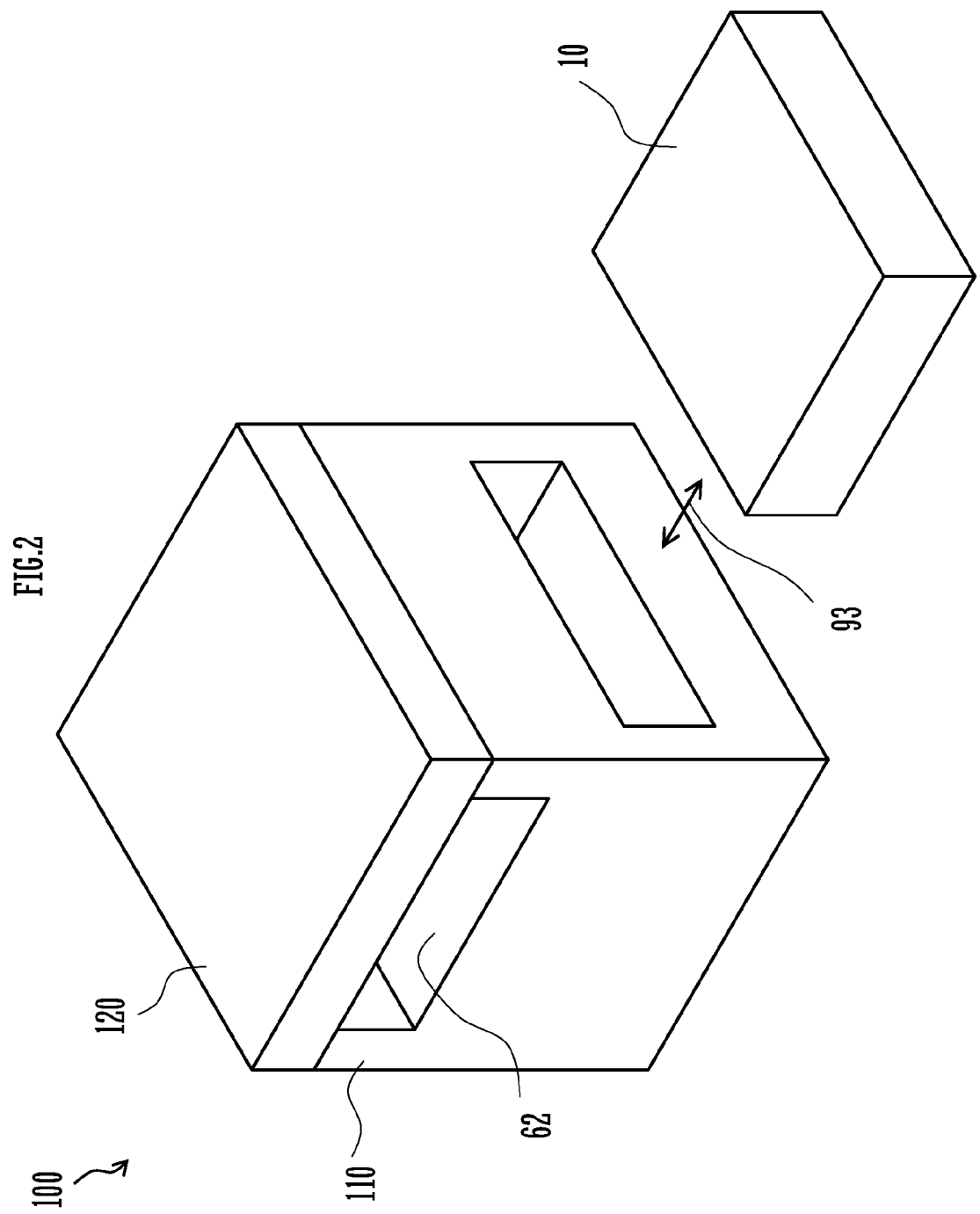

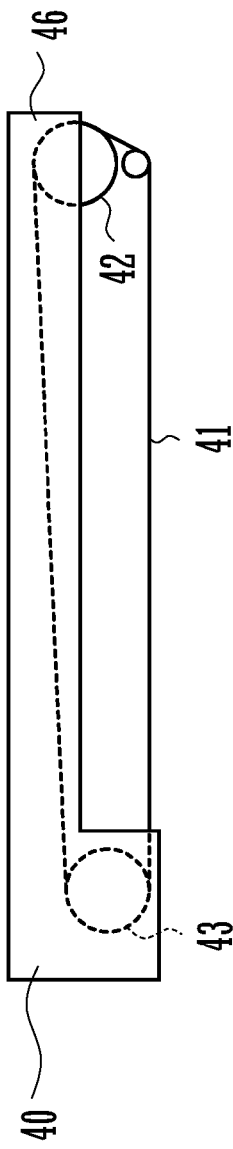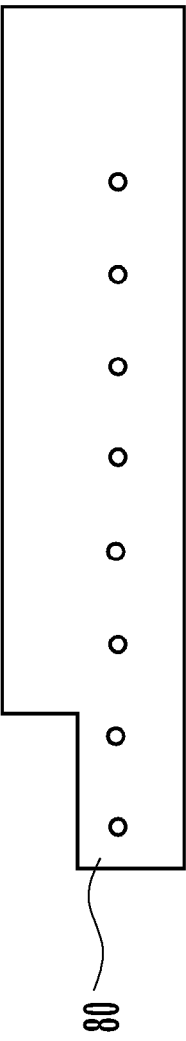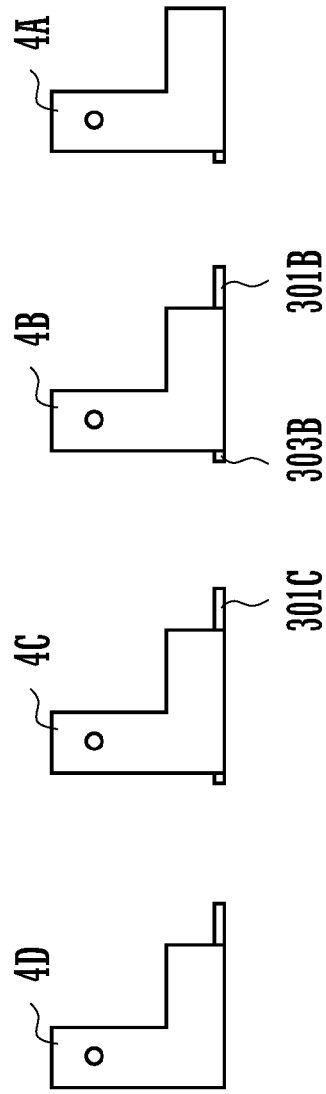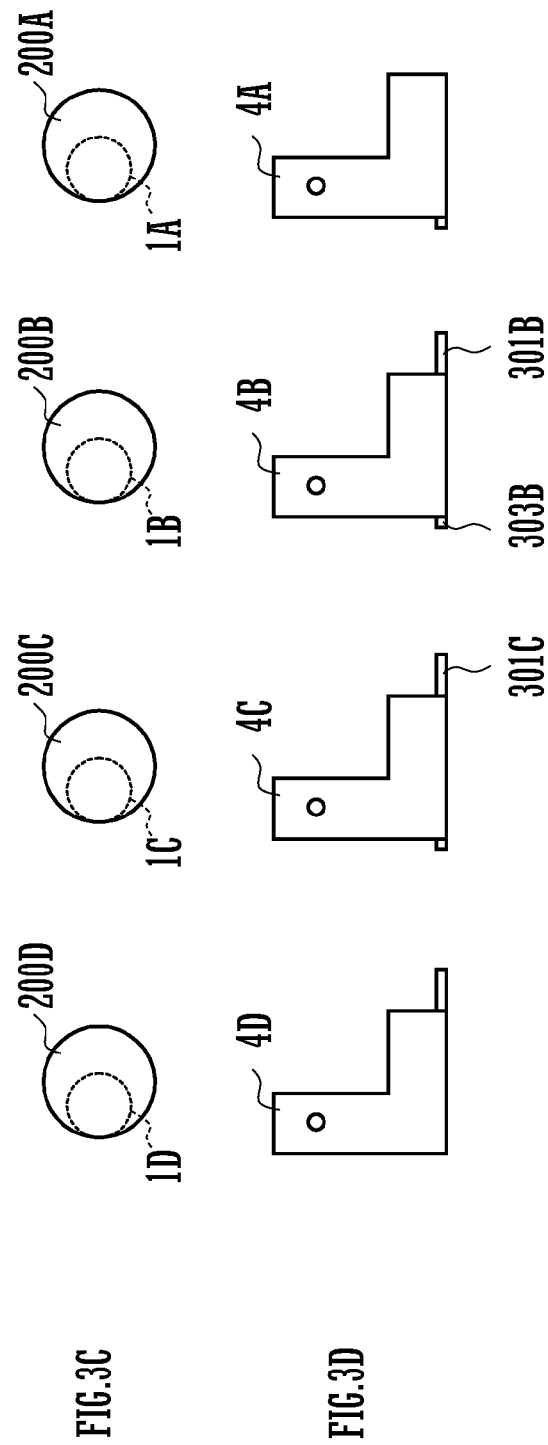

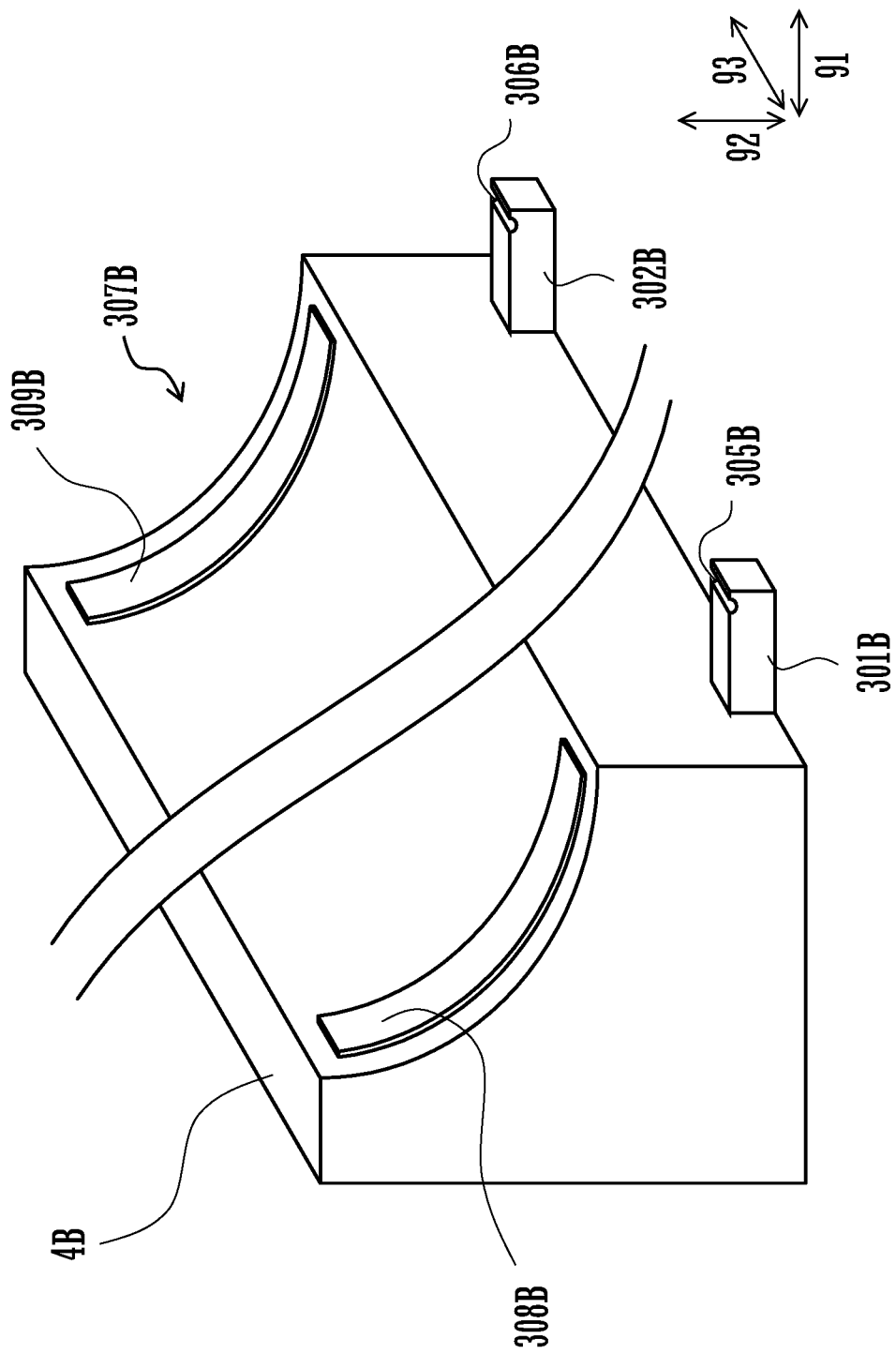

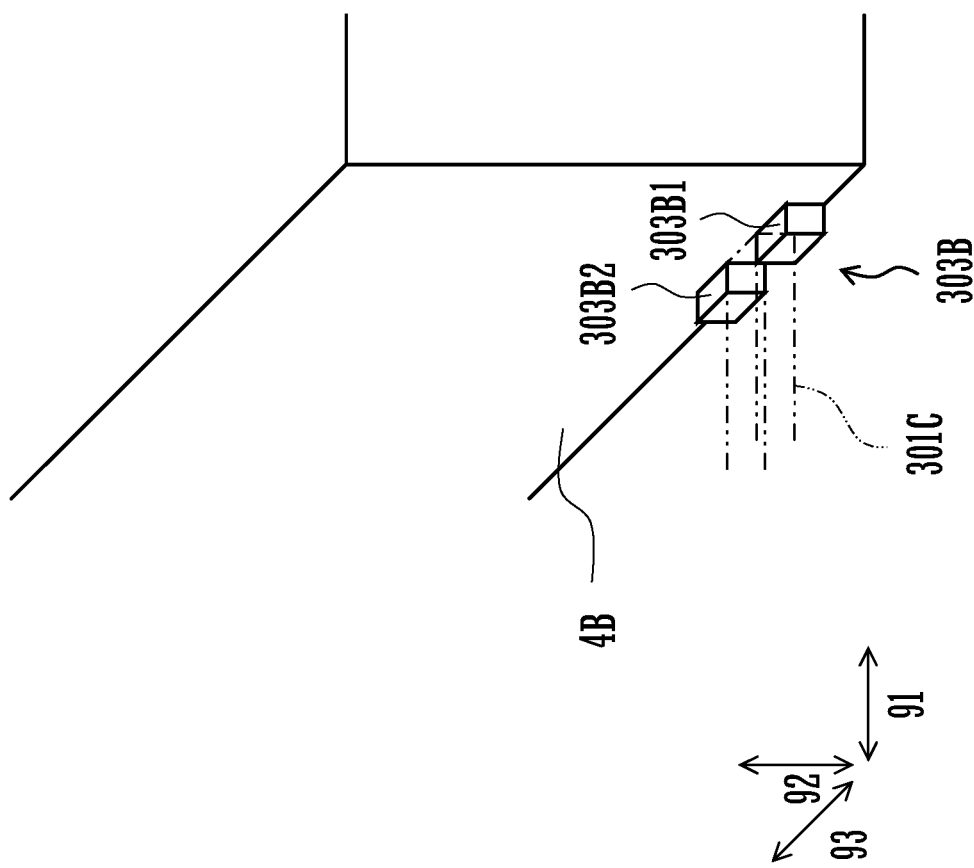

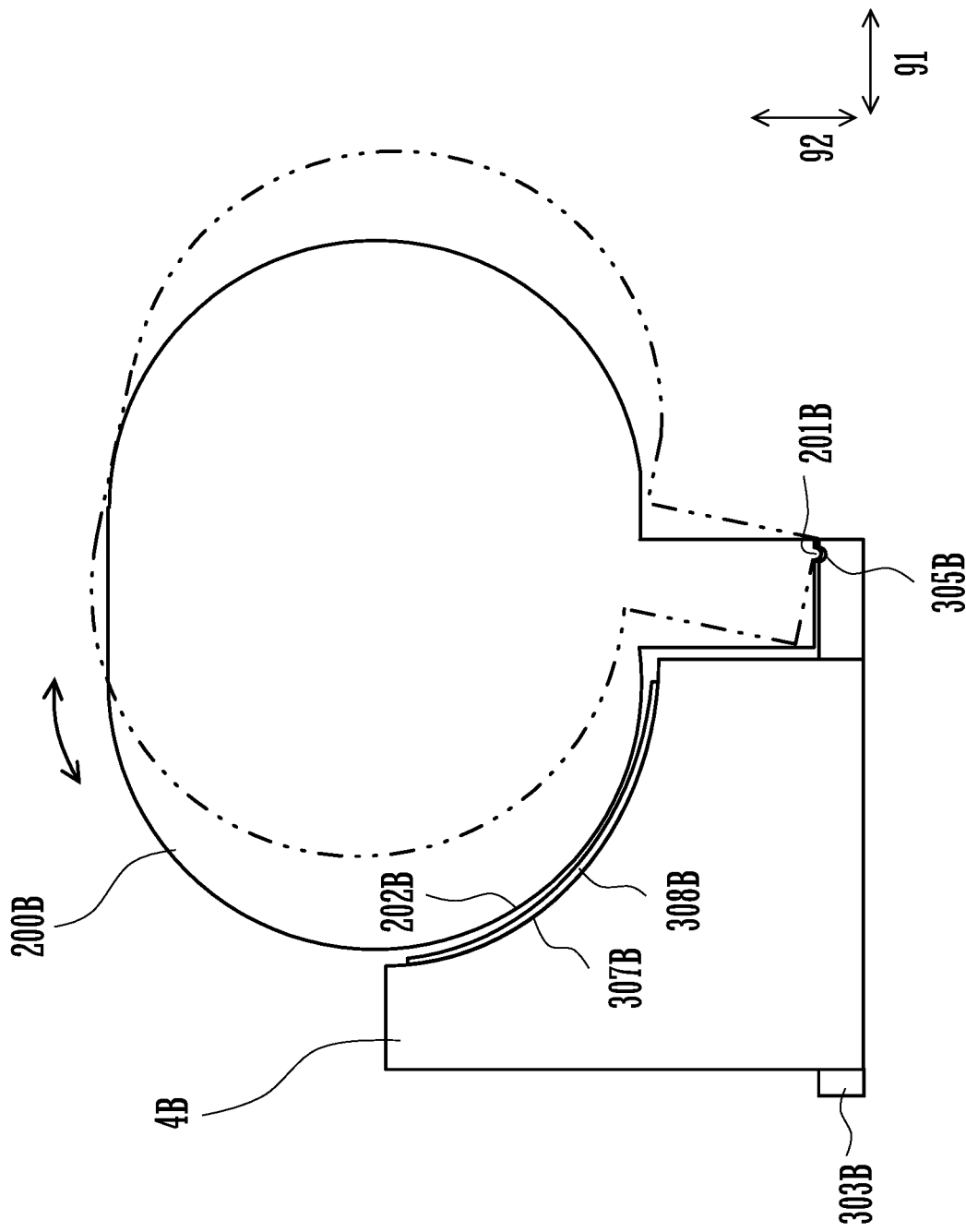

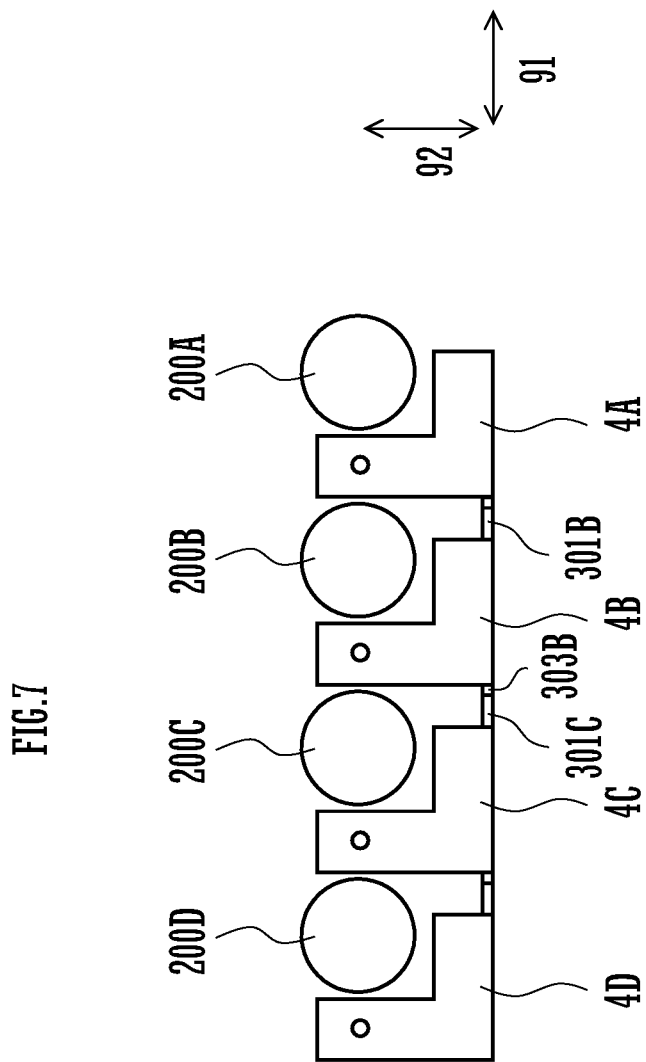

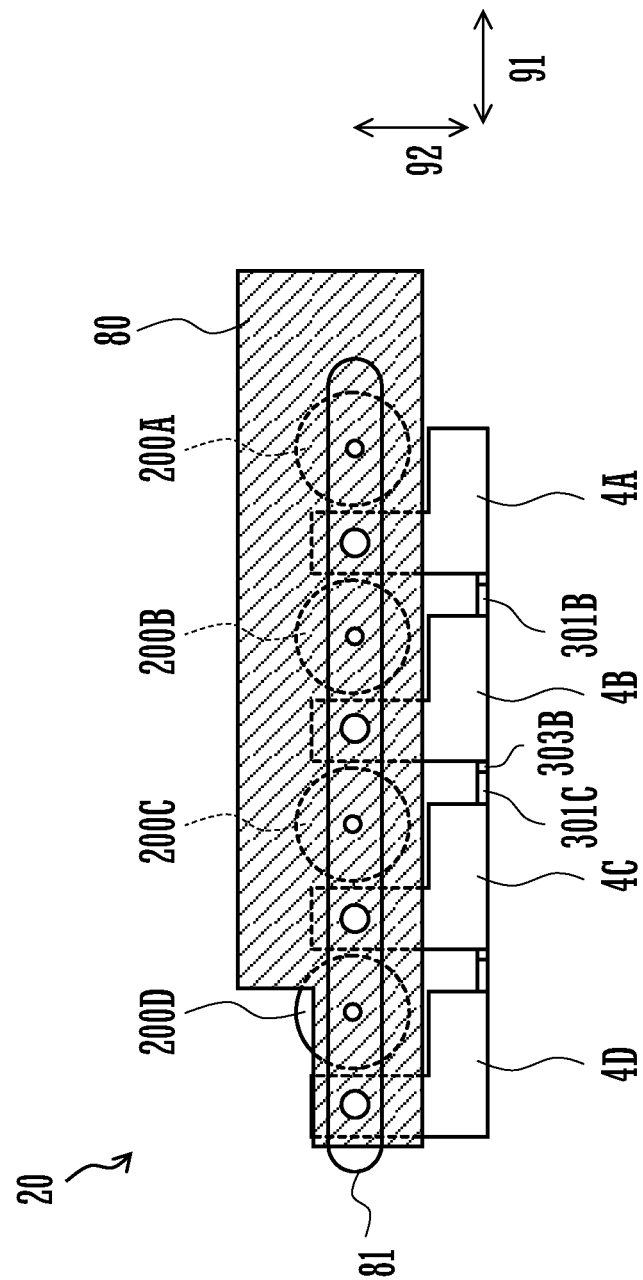

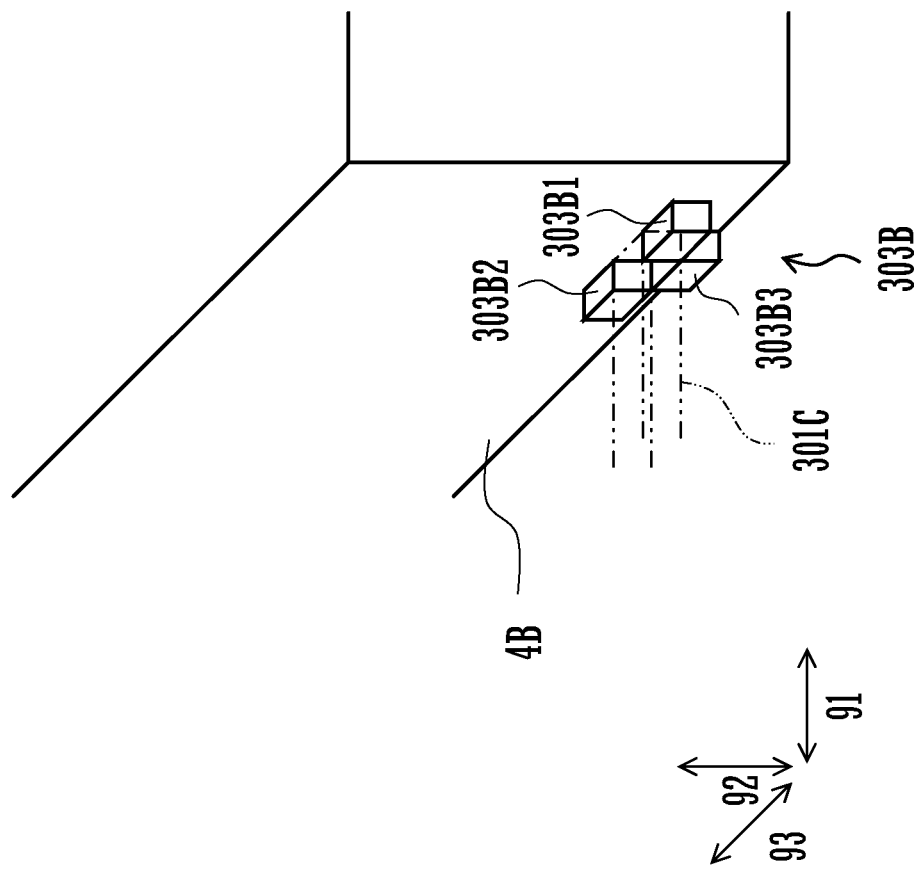

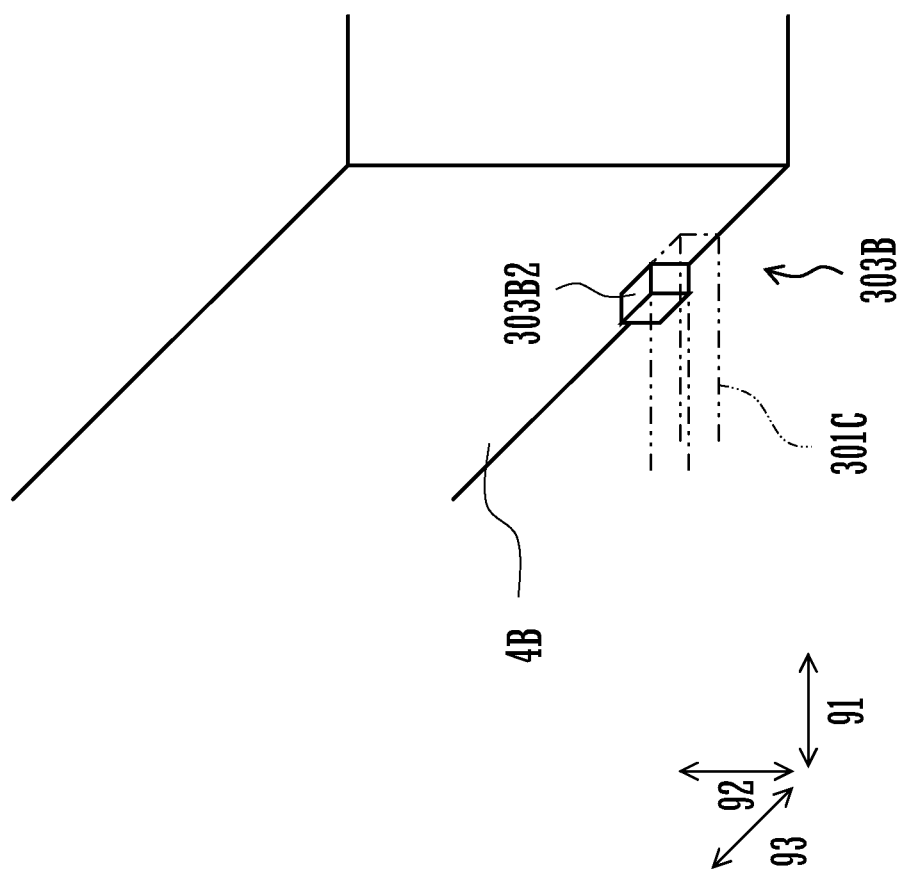

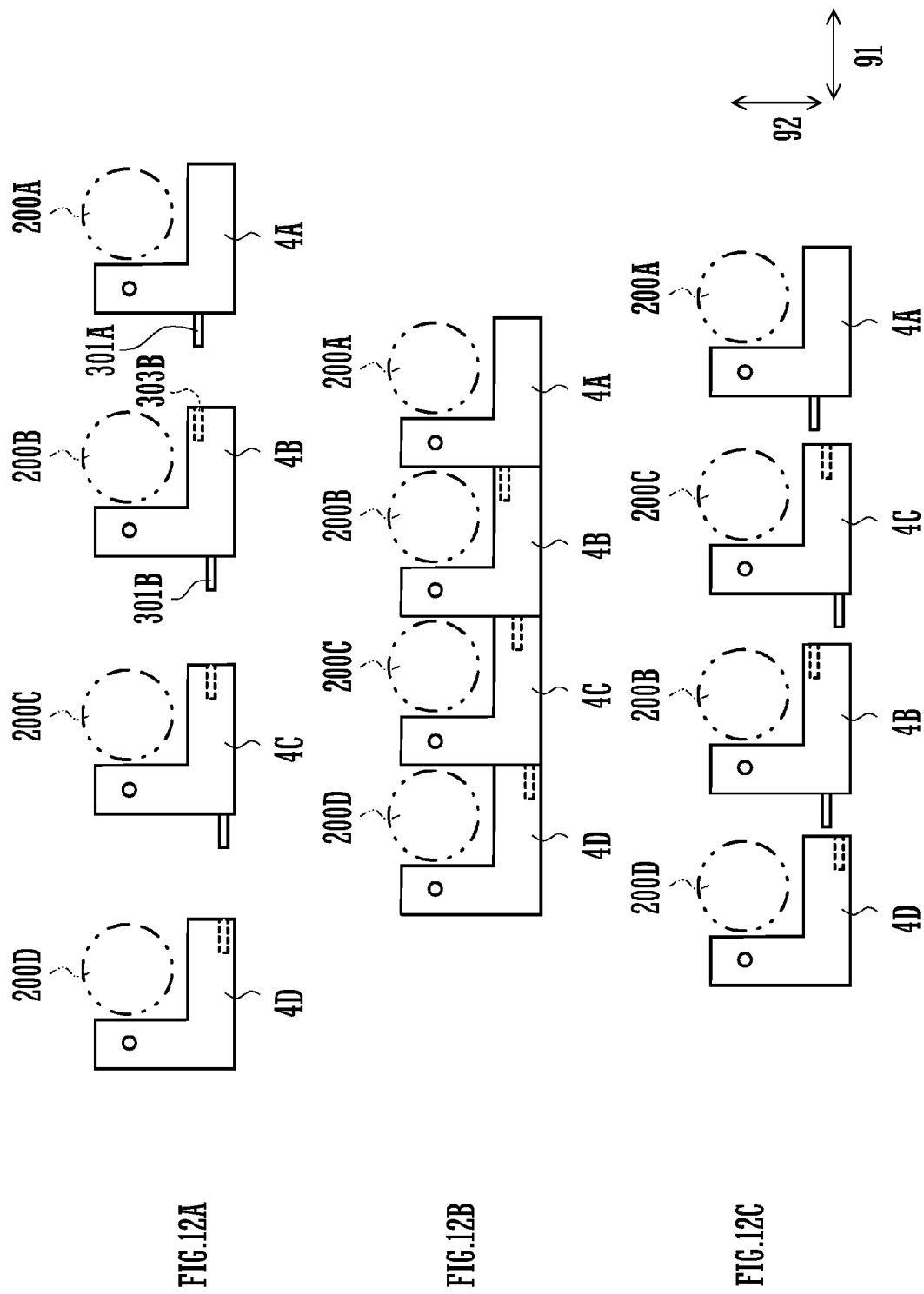

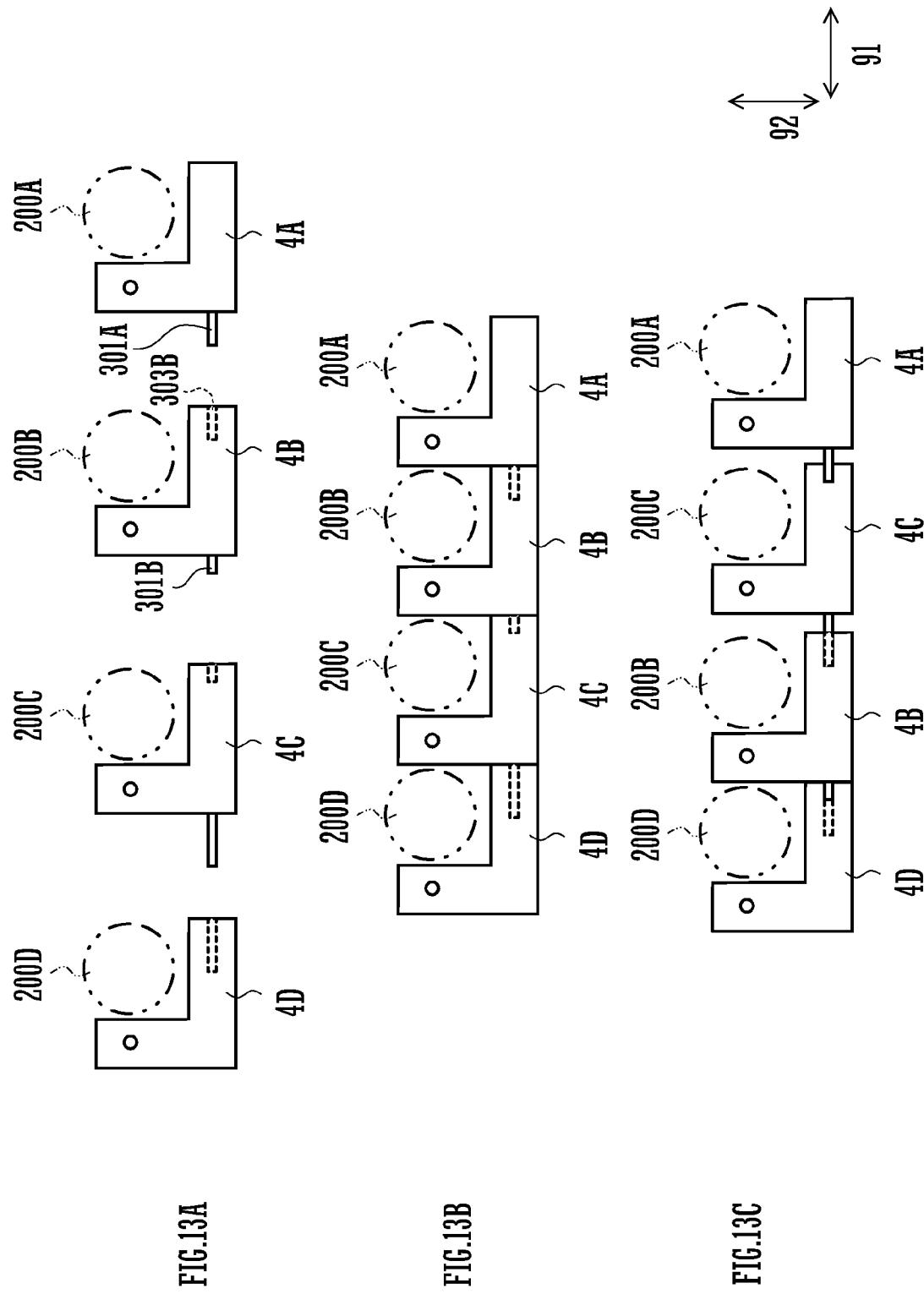

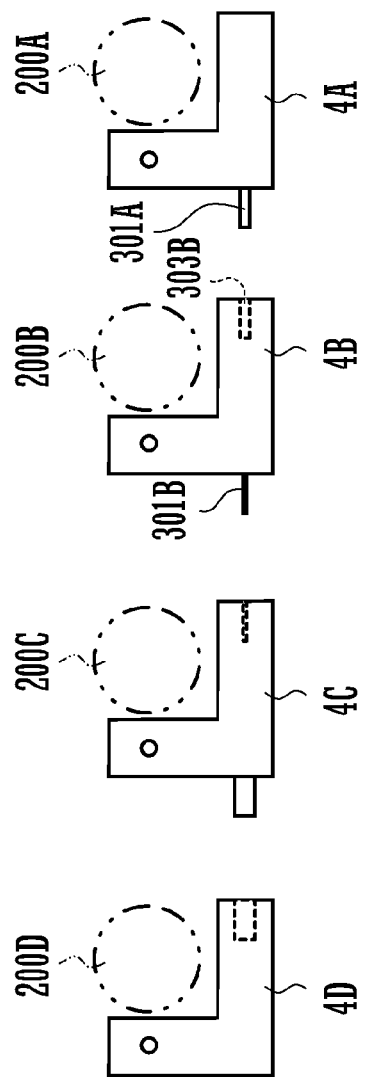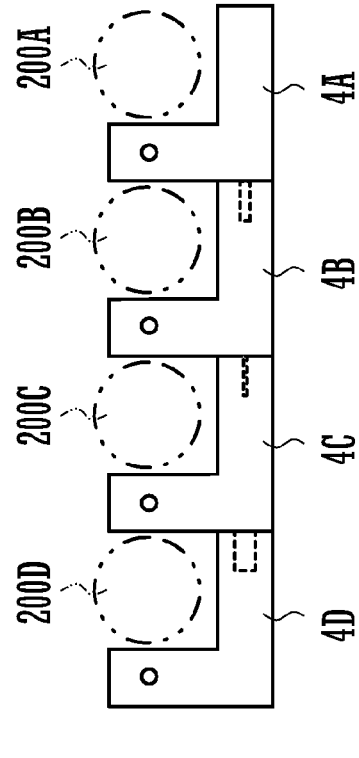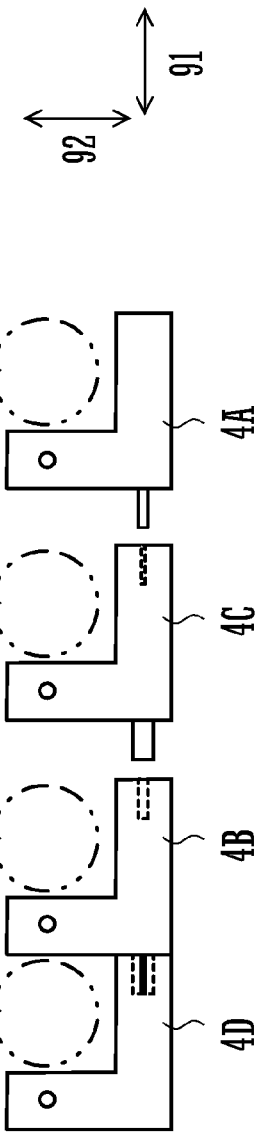

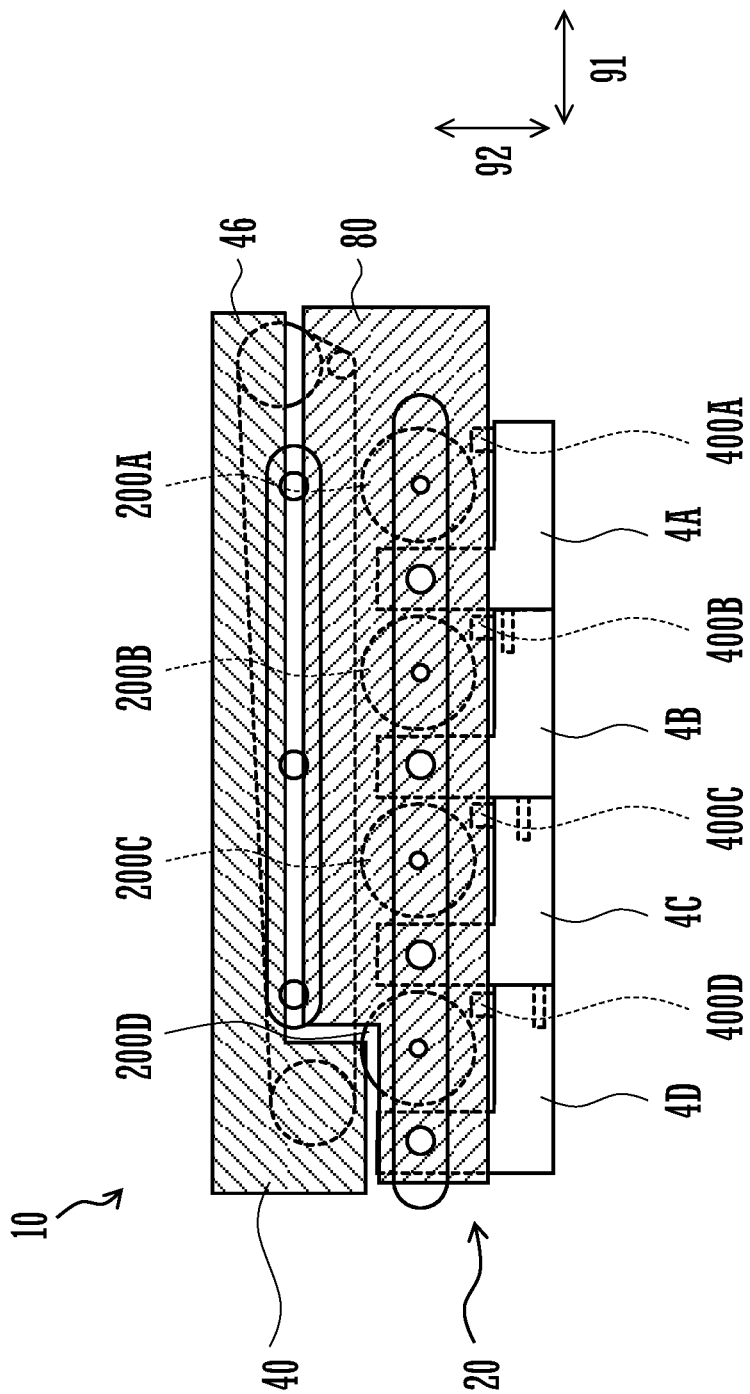

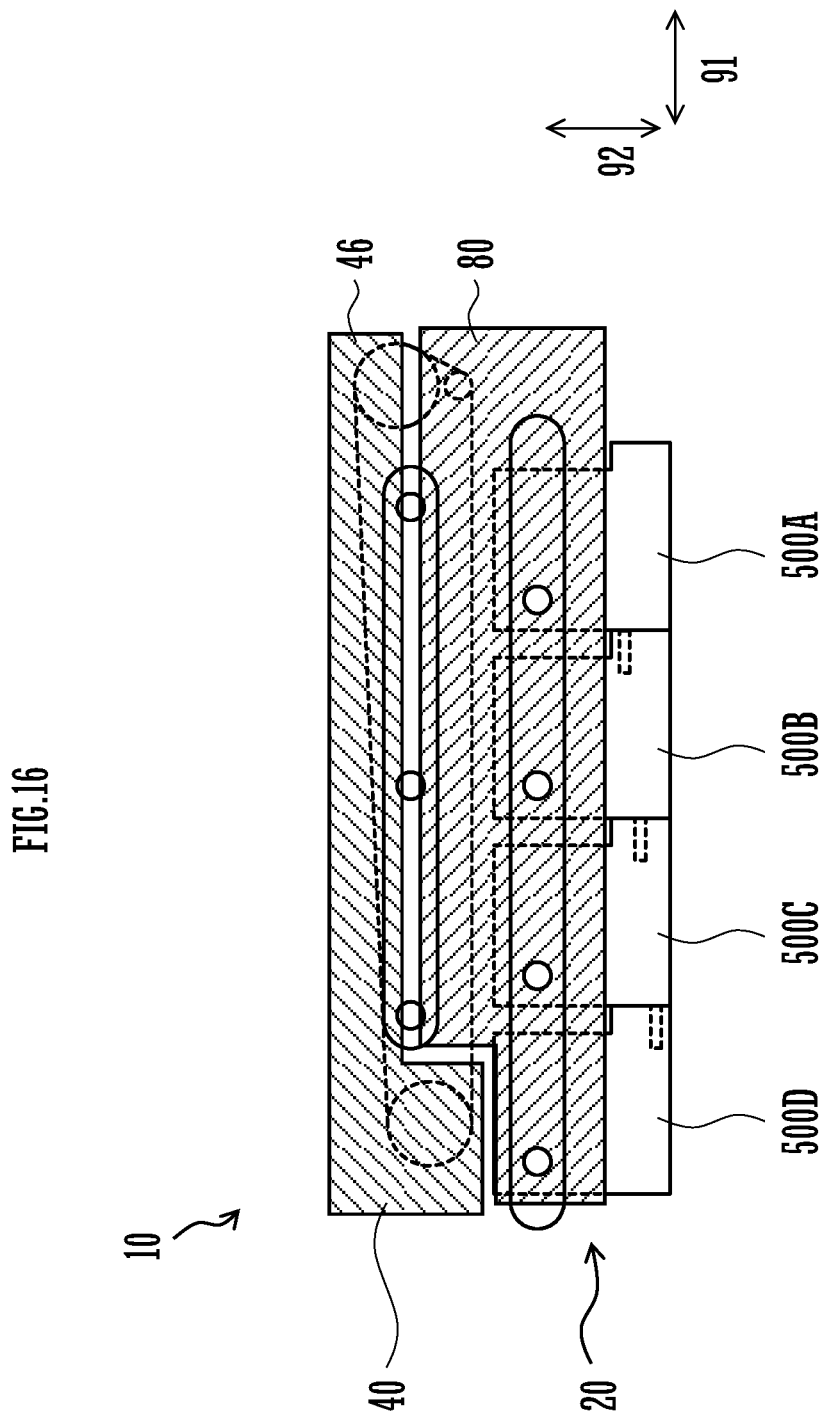

UNIT ASSEMBLY AND IMAGE FORMING APPARATUS

TECHNICAL FIELD

The present invention relates to a unit assembly incorporated in a tandem type image forming apparatus that employs the intermediate transfer method in which a developer image is transferred onto a sheet of paper through an intermediate transfer unit, and to an image forming apparatus provided with such a unit assembly.

BACKGROUND ART

A tandem type image forming apparatus that employs the intermediate transfer method is provided with: a processing unit such as a process unit including a photoreceptor drum, a developing unit including a developer bearing member, and an exposure unit including an exposure member; and an intermediate transfer unit. In a case in which these units are incorporated in the apparatus body of the image forming apparatus separately, in order not to damage the photoreceptor drum when the units are inserted into the apparatus body, it is necessary to provide a space between the developing unit or the intermediate transfer unit and the photoreceptor drum. Therefore, the accuracy of relative positions between the units is reduced and a color shift occurs, which causes a risk that an image quality may be reduced.

In view of the foregoing, an image forming apparatus having a configuration in which a plurality of processing units are linked and integrated by being mounted on a tray and a configuration in which each of the plurality of processing units is provided with a link portion in order to link the plurality of process units to each other has been known (see Patent Literature 1, for example). In such a conventional image forming apparatus, both positioning and link fixing of the plurality of processing units are performed by a single means such as a tray or a link portion.

CITATION LIST

Patent Literature

Patent Literature 1: Japanese Patent Laid-Open Publication No. H9-304994

SUMMARY OF INVENTION

Technical Problem

However, in the conventional image forming apparatus, in the configuration in which a plurality of processing units are linked and integrated by being mounted on a tray, since both relative positioning and link fixing between the plurality of processing units have been performed by the tray, in a case in which distortion occurs in the tray or in a case in which backlash occurs in the mounting portion of the processing units in the tray, the accuracy of positions may be lowered even if the processing units can be linked and fixed. Furthermore, since the positioning and the link fixing are performed by the single means, it is difficult to perform fine adjustment of positions during linking. Moreover, in the configuration in which each of the plurality of processing units is provided with a link portion in order to link the plurality of process units to each other, backlash is likely to occur between an inner rail and an outer rail that constitute the link portion, and there are risks that not only the accuracy of positions is lowered but also the stability of link fixing is lowered. In addition, in the above described conventional image forming apparatus, nothing about improvement of the accuracy of positions between the processing units and the intermediate transfer unit has been considered.

An object of the present invention is to provide a unit assembly capable of improving the accuracy of positions between a plurality of first processing units and also capable of improving even the accuracy of positions between an image forming unit having the plurality of first processing units and an intermediate transfer unit, and an image forming apparatus provided with such a unit assembly.

Solution to Problem

A unit assembly according to preferred embodiments of the present invention is configured to be capable of being inserted into and removed from the apparatus body of an image forming apparatus that performs an electrophotographic image forming process. The unit assembly is provided with an image forming unit and an intermediate transfer unit. The image forming unit has a plurality of first processing units, a positioning portion, and a link member. The plurality of first processing units each include a first image forming member among a plurality of image forming members that form a developer image. The positioning portion determines the mutual relative positions of the plurality of first processing units with respect to each other. The link member links the plurality of first processing units with respect to each other in a state in which the mutual relative positions of the plurality of first processing units are determined. The intermediate transfer unit bears the developer image formed by the plurality of image forming members and carries the developer image to a position in which the developer image is transferred onto a sheet of paper. The intermediate transfer unit is held by the image forming unit.

With this configuration, the plurality of first processing units are linked and fixed, and integrated and thus constitute the image forming unit, and furthermore the image forming unit holds the intermediate transfer unit and thus constitutes the unit assembly. Since the plurality of first processing units and the intermediate transfer unit are integrated outside the apparatus body and are inserted into and removed from the apparatus body as the unit assembly, it is unnecessary to provide a space between the first processing units and the intermediate transfer unit for preventing the first processing units and the intermediate transfer unit from being damaged at a time of assembly, and, compared to a case in which the units are separately inserted and removed, the accuracy of relative positions between the units in the apparatus body can be improved. Moreover, space saving can realize miniaturization.

In addition, the mutual relative positions of the plurality of first processing units are determined with respect to each other by the positioning portion that is provided separately from the link portion, which can miniaturize the positioning portion and can suppress distortion and deflection of the positioning portion. Thus, compared to a case in which both the positioning and the link fixing are performed by a single means, the accuracy of positions between the plurality of first processing units can be improved. In addition, the plurality of positioned first processing units are further linked to the link portion, so that an accurately positioned state can be stabilized. Furthermore, the positioning and the linking are performed by separate means, so that the fine adjustment of the positions is easily performed during the linking. In this manner, by providing the positioning portion and the link portion separately, compared to the case in which the positioning and the link fixing are provided by a single means, both the accuracy of the positions and the stability of the link fixing can be improved. Moreover, as described above, since, in the state in which the image forming unit is caused to hold the intermediate transfer unit in the outside of the apparatus body and both units are set as a unit assembly, the unit assembly is inserted into and removed from the apparatus body, the accuracy of positions between the image forming unit and the intermediate transfer unit can also be improved. Therefore, deviation of an image transferred from the image forming unit to the intermediate transfer unit can be suppressed and an image quality can be improved.

An image forming apparatus according to the present invention is provided with such a unit assembly.

With this configuration, since a plurality of first processing units and an intermediate transfer unit are inserted into and removed from an apparatus body as a unit assembly, compared to a case in which the units are separately inserted and removed, positional deviation in the apparatus body is suppressed.

Advantageous Effects of Invention

According to the present invention, the accuracy of positions between a plurality of first processing units can be improved, and even the accuracy of positions between an image forming unit having the plurality of first processing units and an intermediate transfer unit can also be improved.

BRIEF DESCRIPTION OF DRAWINGS

FIG. 2 is an external perspective view showing a state in which the unit assembly is removed from an apparatus body.

FIG. 3A to FIG. 3D are views showing members provided in the unit assembly.

FIG. 4 is a perspective view from a right oblique side of a developing unit showing an extending portion included in a positioning portion.

FIG. 5 is a perspective view from a left oblique side of the developing unit showing a receiving portion included in the positioning portion.

FIG. 6 is a front view of a first processing unit and the developing unit.

FIG. 7 is a front view showing a state in which a plurality of first processing units are held by a plurality of developing units, respectively and in which the mutual relative positions of the plurality of developing units are determined with respect to each other.

FIG. 8 is a front view of an image forming unit.

FIG. 10 is a perspective view from a left oblique side of a developing unit showing a receiving portion of a positioning portion according to a first variant embodiment.

FIG. 11 is a perspective view from a left oblique side of a developing unit showing a receiving portion of a positioning portion according to a second variant embodiment.

FIG. 12A to FIG. 12C are front views of a developing unit having a positioning portion according to a third variant embodiment.

FIG. 13A to FIG. 13C are front views of a developing unit having a positioning portion according to a fourth variant embodiment.

FIG. 14A to FIG. 14C are front views of a developing unit having a positioning portion according to a fifth variant embodiment.

FIG. 15 is a front view showing another exemplary configuration of a unit assembly according to another embodiment.

FIG. 16 is a front view showing further another exemplary configuration of a unit assembly according to another embodiment.

DESCRIPTION OF EMBODIMENTS

An image forming apparatus 100 provided with a unit assembly 10 according to a preferred embodiment of the present invention will be described with reference to the drawings.

Figure 1:
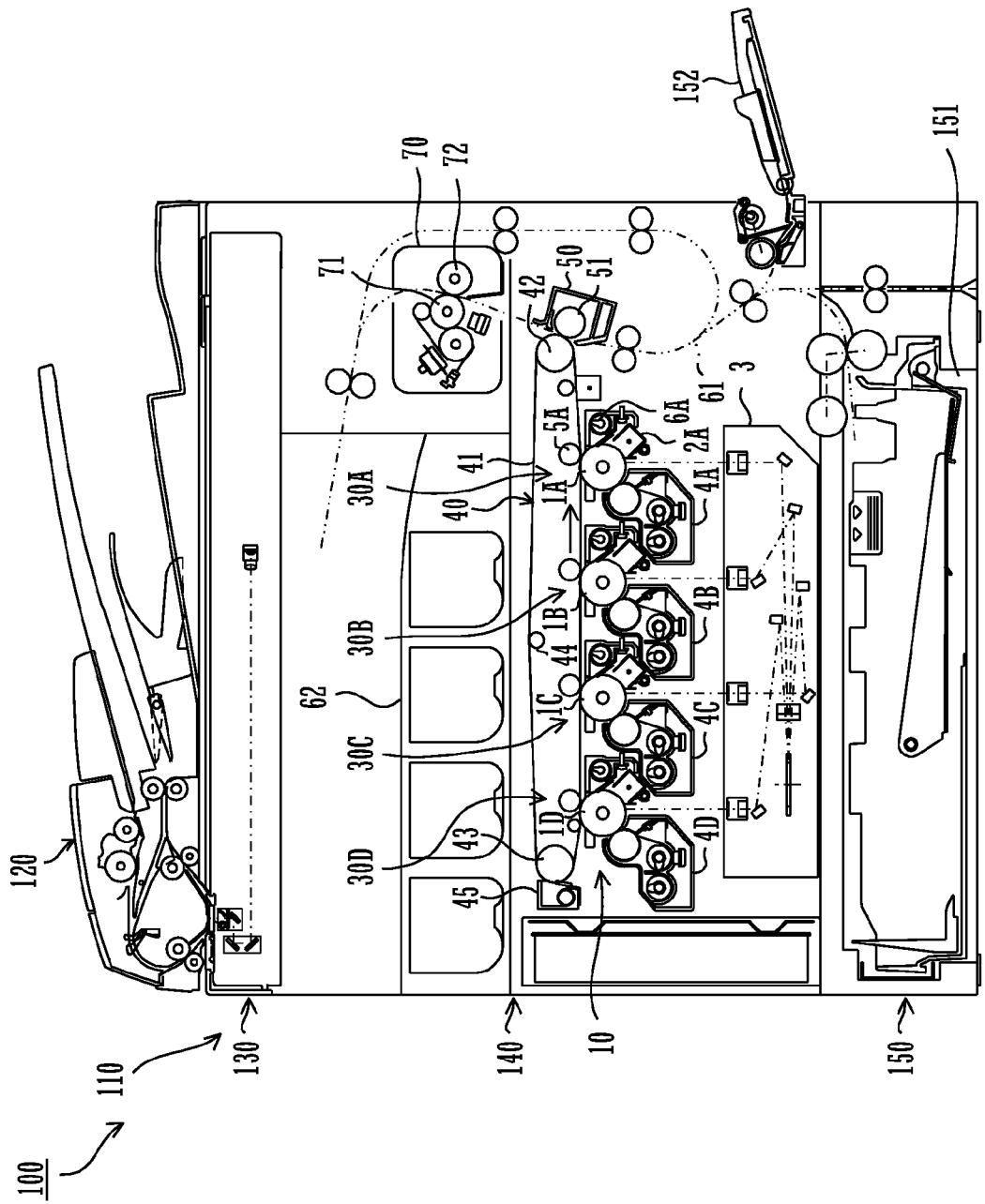
FIG. 1 is a sectional front view showing a schematic configuration of an image forming apparatus provided with a unit assembly according to a preferred embodiment of the present invention.

As shown in FIG. 1, the image forming apparatus 100 is provided with an apparatus body 110, and an Automatic Document Feeder (ADF) 120. The image forming apparatus 100 is configured to form a polychrome or monochrome image on a sheet of paper based on image data generated from a document or image data inputted from outside. The sheet of paper includes a sheet recording medium such as plain paper, photographic paper, and an OHP film.

The ADF 120 is arranged on the apparatus body 110.

The apparatus body 110 is provided with an image reading portion 130, an image forming portion 140, and a paper feeding portion 150.

The image reading portion 130 is arranged in the upper part of the apparatus body 110, in a fixed document reading mode, reads an image of a fixedly arranged document and generates image data, and, in a fed document reading mode, reads an image of a document being fed one by one by the ADF 120 and generates image data.

The image forming portion 140 is provided with an optical scanning device 3, four image forming stations 30A, 30B, 30C, and 30D, an intermediate transfer unit 40, a secondary transfer unit 50, and a fixing device 70, and performs an electrophotographic image forming process onto a sheet of paper.

The intermediate transfer unit 40 may preferably have an intermediate transfer belt 41, a driving roller 42, a driven roller 43, and a tension roller 44. The intermediate transfer belt 41 is stretched over the driving roller 42, the driven roller 43, and the tension roller 44 and forms a loop-shaped path of movement.

The image forming portion 140 forms, at the image forming stations 30A to 30D, a toner image (a developer image) of respective hues of the four colors consisting of black, along with cyan, magenta, and yellow that are the three primary colors of subtractive color mixture obtained by color separation of a color image. The image forming stations 30A to 30D are aligned along the path of movement of the intermediate transfer belt 41. The image forming stations 30B to 30D are configured substantially in the same manner as the image forming station 30A.

The image forming station 30A, which is associated with black, includes a photoreceptor drum 1A, a charging device 2A, a developing unit 4A, a primary transfer roller 5A, and a cleaning unit 6A.

The photoreceptor drum 1A is rotated in a predetermined direction by a driving power transmitted thereto. The charging device 2A electrostatically charges the peripheral surface of the photoreceptor drum 1A to a predetermined potential.

The optical scanning device 3 illuminates respective laser beams modulated by the image data on the respective hues of black, cyan, magenta, and yellow onto the respective photoreceptor drums 1A, 1B, 1C, and 1D of the image forming stations 30A to 30D. On the peripheral surfaces of the photoreceptor drums 1A to 1D are respectively formed electrostatic latent images based on the image data on the respective hues of black, cyan, magenta, and yellow.

The developing unit 4A supplies toner (a developer) of black that is the hue of the image forming station 30A, onto the peripheral surface of the photoreceptor drum 1A, thereby visualizing the electrostatic latent image into a toner image. Similarly, each of the developing units 4B, 4C, and 4D of the image forming stations 30B to 30D supplies toner of the respective hues to the peripheral surface of the photoreceptor drums 1B to 1D.

The outer peripheral surface of the intermediate transfer belt 41 sequentially faces the peripheral surfaces of the photoreceptor drums 1A to 1D. The primary transfer roller 5A is arranged at a position facing the photoreceptor drum 1A across the intermediate transfer belt 41. Respective positions at which the intermediate transfer belt 41 faces the photosensitive drums 1A to 1D each other are primary transfer positions.

The primary transfer roller 5A is applied with a primary transfer bias by a constant voltage control, the primary transfer bias having a polarity (plus, for example) opposite to the electrostatically charged polarity (minus, for example) of the toner. The same applies to the image forming stations 30B to 30D. This causes the toner images of the respective hues formed on the respective peripheral surfaces of the photoreceptor drums 1A to 1D to be primarily transferred sequentially onto the outer peripheral surface of the intermediate transfer belt 41 so as to be superimposed upon one another, thereby causing to form a full-color toner image on the outer peripheral surface of the intermediate transfer belt 41.

However, in a case in which image data on only a part of the hues of black, cyan, magenta, and yellow is inputted, only at a part of the photoreceptor drums corresponding to the part of the hues of the inputted image data among the four photoreceptor drums 1A to 1D, an electrostatic latent image and a toner image are formed and thus only the toner image of the part of the hues is primarily transferred onto the outer peripheral surface of the intermediate transfer belt 41.

The cleaning unit 6A collects the toner remaining on the peripheral surface of the photoreceptor drum 1A after the development and primary transfer.

The toner images that has primarily been transferred onto the outer peripheral surface of the intermediate transfer belt 41 at the respective primary transfer positions is fed by rotation of the intermediate transfer belt 41 to a secondary transfer position at which the intermediate transfer belt 41 and a secondary transfer roller 51 that is provided in the secondary transfer unit 50 face each other.

The paper feeding portion 150 is provided with a paper feed cassette 151, a manual feed tray 152, and a paper feed path 61. As necessary, a sheet of paper is selectively fed from either of the paper feed cassette 151 or the manual feed tray 152 to the paper feed path 61.

The paper feed path 61 is formed so as to extend from each of the paper feed cassette 151 and the manual feed tray 152 to a paper output tray 62 by way of the secondary transfer position and the fixing device 70.

The secondary transfer roller 51 is pressed against the driving roller 42 at a predetermined nip pressure with the intermediate transfer belt 41 held in between.

When the sheet of paper fed from the paper feeding portion 150 is fed by way of the secondary transfer position, a secondary transfer bias of a polarity (plus, for example) opposite to the electrostatically charged polarity (minus, for example) of the toner is applied to the secondary transfer roller 51 by the constant voltage control, which thus causes the toner image born on the outer peripheral surface of the intermediate transfer belt 41 to be secondarily transferred onto the sheet of paper.

The toner remaining on the intermediate transfer belt 41 after the toner image has been transferred onto the sheet of paper is collected by an intermediate transfer belt cleaning device 45.

The sheet of paper onto which the toner image has been transferred is led to the fixing device 70. The fixing device 70 is provided with a heating roller 71 and a pressurizing roller 72 and heats and pressurizes the sheet of paper passing between the heating roller 71 and the pressurizing roller 72, thereby fixing the toner image on the sheet of paper. The sheet of paper on which the toner image has been fixed is outputted onto the paper output tray 62 with the face on which the toner image has been fixed facing down.

One kind or plural kinds of the image forming members as a member to form a toner image are unitized as a processing unit, respectively. One or more kinds of processing units and the intermediate transfer units 40 are included in the unit assembly 10. The image forming member may preferably include the photoreceptor drums 1A to 1D, the charging device 2A, a developing roller, the primary transfer roller 5A, and the cleaning unit 6A. The developing roller may preferably be a developer bearing member.

As shown in FIG. 2, the unit assembly 10 is configured to be capable of being inserted into and removed from the apparatus body 110 in a predetermined third direction 93 parallel to the axis of rotation of the photoreceptor drum 1A. The third direction 93 may preferably be a direction parallel to a direction in which the unit assembly 10 is inserted into and removed from the apparatus body 110.

As shown in FIG. 3A to FIG. 3D, the unit assembly 10 according to this first preferred embodiment is provided with the intermediate transfer unit 40, a link member 80, a plurality of first processing units 200A, 200B, 200C, and 200D, and a plurality of developing units 4A, 4B, 4C, and 4D. The developing units 4A to 4D each may preferably include a developing roller and correspond to second processing units. As an example, the first processing units 200A to 200D may be process units that include the photoreceptor drums 1A to 1D, respectively. It is to be noted that, in FIG. 3A to FIG. 3D, FIG. 7 to FIG. 9, FIG. 12A to FIG. 12C, FIG. 13A to FIG. 13C, FIG. 14A to FIG. 14C, and FIG. 15, the first processing units 200A to 200D and the developing units 4A to 4D are described schematically.

The intermediate transfer unit 40 is further provided with a frame 46 for the intermediate transfer unit, and the driving roller 42 and the driven roller 43 are pivotally supported by the frame 46 for the intermediate transfer unit.

FIG. 4 to FIG. 6 show the configuration of the developing unit 4B that is arranged at a place other than opposite ends in a direction of alignment of the developing units 4A to 4D. The developing unit 4C that is arranged at a place other than the opposite ends and the place of the developing unit 4B is configured in the same manner as the developing unit 4B. The developing unit 4A that is arranged at one end portion is configured in the same manner as the developing unit 4B except that the developing unit 4A has no extending portion, and the developing unit 4D that is arranged at the other end portion is configured in the same manner as the developing unit 4B except that the developing unit 4D has no receiving portion.

As shown in FIG. 4 to FIG. 6, the developing unit 4B may preferably be configured to be positioned so that the center of gravity in a cross section perpendicular to the third direction 93 is positioned below the center in a height direction. As an example, the development unit 4B is configured, in the cross section perpendicular to the third direction, so that the size of the cross section in the horizontal direction becomes larger toward the bottom portion. As another example, the development unit 4B can be configured so that the shape of the cross section perpendicular to the third direction is a substantially triangular shape or a substantially trapezoidal shape.

This causes the stability of the developing unit 4B to be enhanced when the developing unit 4B is placed on a work table and the developing unit 4B is caused to hold the first processing unit 200B, so that the workability is improved.

In the preferred embodiment, three directions that are perpendicular to one another may preferably be set as a first direction 91, a second direction 92, and the third direction 93. The first direction 91 is a direction the same as the direction of alignment of the developing units 4A to 4D. The second direction 92 is a direction perpendicular to a region in which the intermediate transfer belt 41 faces an image forming unit 20 (see FIG. 9) to be described later. The third direction 93, as described above, is a direction in which the unit assembly 10 is inserted into and removed from the apparatus body 110.

The developing unit 4B has a positioning portion. The positioning portion includes the extending portions 301B and 302B and the receiving portions 303B and 304B (however, the receiving portion 304B is not shown). The extending portions 301B and 302B are provided at a first end portion of the developing unit 4B in the first direction 91, that is, the opposite end portions of the developing unit 4B in the third direction 93. The receiving portions 303B and 304B are provided at a second end portion of the developing unit 4B in the first direction 91, that is, the opposite end portions of the developing unit 4B in the third direction 93.

In the developing unit 4B, the extending portions 301B and 302B, in the first direction 91, extend only by a predetermined length from the first end portion of the developing unit 4B toward the developing unit 4A that is adjacent to the first end portion.

The receiving portions 303B and 304B are configured so as to receive the extending portions 301C and 302C (however, the extending portion 302C is not shown) of the developing unit 4C that is adjacent to the second end portion of the developing unit 4B, respectively.

The receiving portions 303B and 304B are configured so as to restrict the movement, in at least the first direction 91, of the extending portions 301C and 302C of the developing unit 4C that is adjacent to the receiving portions 303B and 304B, respectively.

The receiving portion 304B is configured in the same manner as the receiving portion 303B. As an example, the receiving portion 303B includes a first projecting portion 303B1 and a second projecting portion 303B2 that nip the extending portion 301C of the developing unit 4C that is adjacent to the receiving portions 303B and 304B in the third direction 93.

By nipping the extending portion 301C of the developing unit 4C between the first projecting portion 303B1 and the second projecting portion 303B2 of the developing unit 4B, the first projecting portion 303B1 and the second projecting portion 303B2 restrict the movement of the extending portion 301C in both directions in the third direction 93. Therefore, the position of the developing unit 4C in the third direction 93 with respect to the developing unit 4B is specified accurately. Accordingly, when the mutual relative positions of the plurality of developing units 4A to 4D are determined with respect to each other, the accuracy of positions between the plurality of developing units 4A to 4D in the third direction 93 can be improved.

The extending portion 301B has a bearing portion 305B that extends in the third direction 93, near a tip portion of the extending portion 301B. The extending portion 302B has a bearing portion 306B that extends in the third direction 93, near a tip portion of the extending portion 302B.

The first processing unit 200B has a shaft portion 201B that extends in the third direction 93, in a bottom portion. The shaft portion 201B is rotatably born by the bearing portions 305B and 306B.

The first processing unit 200B is configured, by rotating in a state in which the shaft portion 201B is supported by the bearing portions 305B and 306B, so that a predetermined first contact portion 202B that is spaced away from the shaft portion 201B is in contact with a predetermined second portion 307B of the developing unit 4B. The second contact portion 307B has a shape along the outer shape of the first contact portion 202B.

In a state in which the first contact portion 202B of the first processing unit 200B and the second contact portion 307B of the developing unit 4B are spaced away from each other, the shaft portion 201B of the first processing unit 200B is supported by the bearing portions 305B and 306B o the developing unit 4B and, from this state, the first processing unit is rotated around the shaft portion 201B. This makes it possible to determine the positions of the first processing unit 200B and the developing unit 4B in two regions of a region in which the shaft portion 201B and the bearing portions 305B and 306B contact each other and a region in which the first contact portion 202B and the second contact portion 307B contact each other and to suppress the first processing unit 200B and the developing unit 4B from being damaged during assembly work.

In addition, the bearing portions 305B and 306B are provided in the extending portions 301B and 302B, which can make a distance between the shaft portion 201B and the first contact portion 202B and a distance between the bearing portions 305B and 306B and the second contact portion 307B longer, so that the accuracy of positions between the first processing unit 200B and the developing unit 4B can be improved.

The developing unit 4B has buffer members 308B and 309B in the second contact portion 307B. This makes it possible to further suppress the first processing unit 200B and the developing unit 4B from being damaged.

As described above, causing the developing units 4A to 4D to hold the first processing units 200A to 200D, respectively and determining the mutual relative positions of the developing units 4A to 4D with respect to each other, as shown in FIG. 7, allow the positioning of the plurality of first processing units 200A to 200D and the plurality of developing units 4A to 4D to be performed accurately. It should be noted that, regarding work sequence, either one of the work of causing the developing units 4A to 4D to hold the first processing units 200A to 200D, respectively and the work of determining the mutual relative positions of the developing units 4A to 4D with respect to each other can be performed prior to the other.

As shown in FIG. 8, in the state in which the plurality of first processing units 200A to 200D are held by the plurality of developing units 4A to 4D, respectively and in which the mutual relative positions of the plurality of developing units 4A to 4D are determined with respect to each other, the plurality of developing units 4A to 4D are linked to each other by the link member 80. It is to be noted that in FIG. 8, for convenience of description, the link member 80 is hatched.

The link member 80 is provided with a through hole at a position corresponding to a screw hole provided in each of the plurality of developing units 4A to 4D. The through hole of the link member 80 may preferably be an oblong hole. The link member 80, by being screwed to the screw hole of each of the plurality of developing units 4A to 4D through the through hole, fixes the mutual relative positions of the plurality of developing units 4A to 4D with respect to each other. At a time of screwing, a washer 81 may preferably be used.

The through hole is an oblong hole that is long in the first direction 91 or the second direction 92, which makes it possible to finely adjust the mutual relative positions of the plurality of developing units 4A to 4D with respect to each other.

As described above, the plurality of developing units 4A to 4D that hold the plurality of first processing units 200A to 200D are link fixed together and constitute an image forming unit 20.

Figure 9:
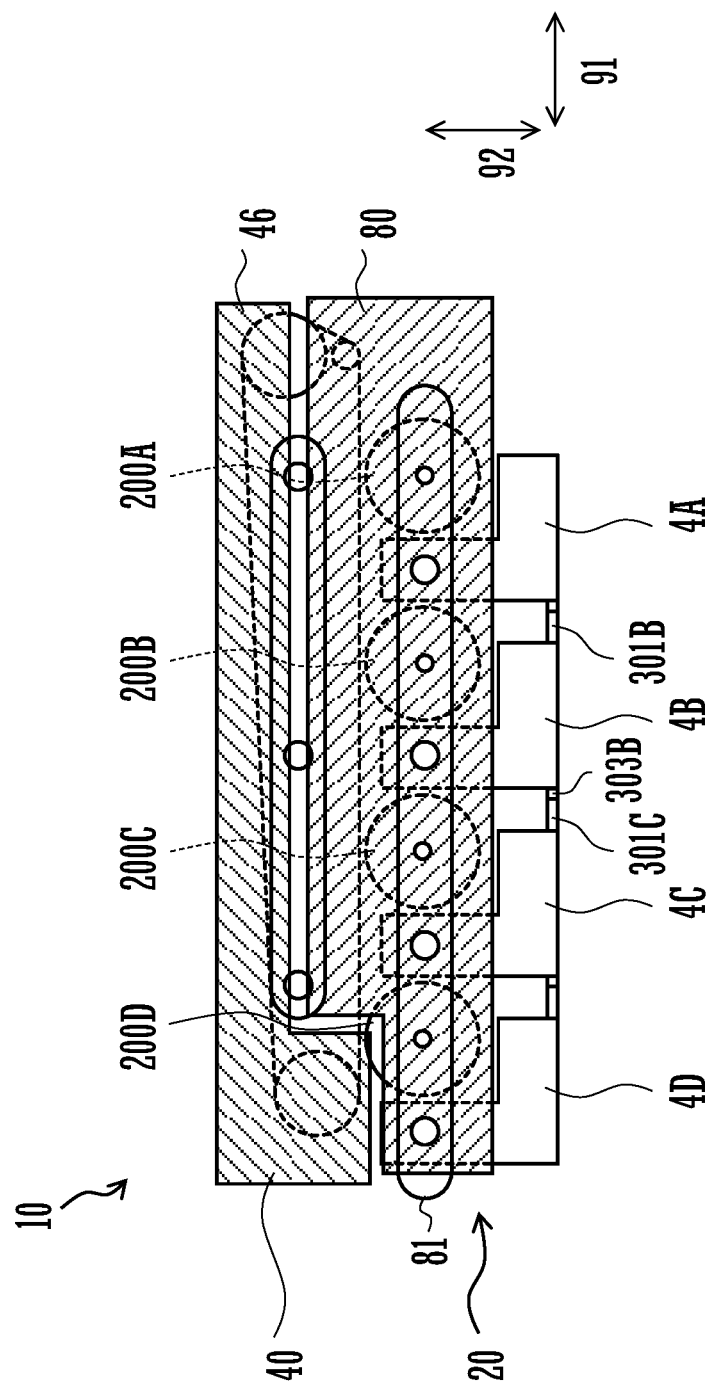
FIG. 9 is a front view of the unit assembly.

As shown in FIG. 9, causing the image forming unit 20 to hold the intermediate transfer unit 40 constitutes the unit assembly 10. It should be noted that in FIG. 9, for convenience of description, the link member 80 and the frame 46 for the intermediate transfer unit are hatched.

As an example, the intermediate transfer unit 40 may be fixed by being screwed to the image forming unit 20 by a washer.

Accordingly, the plurality of developing units 4A to 4D are caused to hold the plurality of first processing units 200A to 200D, and the plurality of developing units 4A to 4D are linked, fixed, and integrated together, which thus constitutes the image forming unit 20, and then the image forming unit 20 is caused to hold the intermediate transfer unit 40, which thus constitutes the unit assembly 10.

Since the plurality of first processing units 200A to 200D, the plurality of developing units 4A to 4D, and the intermediate transfer unit 40 are integrated outside the apparatus body 110 and are thus inserted into and removed from the apparatus body 110 as the unit assembly 10, it is unnecessary to provide a space between the respective units 200A to 200D, 4A to 4D, and 40 for preventing the units from being damaged at the time of assembly, and, compared to a case in which the units 200A to 200D, 4A to 4D, and 40 are separately inserted and removed, the accuracy of relative positions among the units 200A to 200D, 4A to 4D, and 40 in the apparatus body 110 can be improved. Moreover, space saving can realize miniaturization.

In addition, the positioning portion is provided with each of the developing units 4A to 4D separately from the link member 80, so that each positioning portion may preferably specify a distance between two developing units 4A to 4D that are adjacent to each other. Therefore, compared to a case in which the positions of all the developing units 4A to 4D are determined by a single member, the positioning portion can be miniaturized, so that distortion and deflection of the positioning portion is unlikely to occur. This, compared to a case in which both positioning and link fixing are performed by a single means, makes it possible to improve the accuracy of positions between the plurality of developing units 4A to 4D. Accordingly, the accuracy of positions between the plurality of first processing units 200A to 200D can be improved. In addition, the plurality of positioned developing units 4A to 4D are further linked by the link portion 80, so that an accurately positioned state can be stabilized. Furthermore, the positioning and the linking are performed by separate means, so that the fine adjustment of the positions can easily be performed during the linking. In this manner, by providing the positioning portion and the link portion 80 separately, compared to the case in which positioning and link fixing are provided by a single means, both the accuracy of positions and the stability of the link fixing can be improved.

Furthermore, as described above, since, in the state in which the image forming unit 20 is caused to hold the intermediate transfer unit 40 in the outside of the apparatus body 110 and both units are set as a unit assembly 10, the unit assembly 10 is inserted into and removed from the apparatus body 110, the accuracy of positions between the image forming unit 20 and the intermediate transfer unit 40 can also be improved. Therefore, deviation of an image transferred from the image forming unit 20 to the intermediate transfer unit 40 can be suppressed, and the image quality can be improved.

Moreover, by contacting the extending portion 301C and the receiving portion 303B, the mutual relative positions of the developing units 4B and 4C that are adjacent to each other can be accurately determined. The same applies to positioning between the developing units 4A and 4B and positioning between the developing units 4C and 4D. Furthermore, the accuracy of positions can be improved by a simple structure.

Additionally, since the receiving portion 303B restricts the movement of the extending portion 301C in the first direction 91, a mutual distance between the plurality of developing units 4A to 4D can be specified accurately. Therefore, the accuracy of positions between the plurality of developing units 4A to 4D in the first direction 91 can be improved.

Furthermore, since the image forming unit 20 and the intermediate transfer unit 40 are integrated as the unit assembly 10, handling is facilitated, which can provide better operability of work such as replacement, maintenance, and adjustment, and the work efficiency is improved. In addition, at a time of insertion into the apparatus body 110, an erroneous insertion can be suppressed. Therefore, the workability also improves for a user. Furthermore, since the positioning between the plurality of units 200A to 200D, 4A to 4D, and 40 is performed in the outside of the apparatus body 110, as compared with a case of being performed in the apparatus body 110, the positioning can be performed easily and accurately, and the workability of assembly of of the image forming apparatus 100 can be improved.

Subsequently, the variant embodiments of the positioning portion will be described. It is noted that, for convenience of description, for the members configured in the same manner as the above described configuration, the same reference signs are used.

As shown in FIG. 10, the receiving portion 303B of the positioning portion according to a first variant embodiment may preferably be configured to further include a third projecting portion 303B3 that is contact with the extending portion 301C of the developing unit 4C, from at least one side in the second direction 92. As an example, the third projecting portion 303B3 is in contact with the extending portion 301C from below.

By causing the third projecting portion 303B3 of the developing unit 4B to be in contact with the extending portion 301C of the developing unit 4C, the third projecting portion 303B3 restricts the movement of the extending portion 301C in at least one direction in the second direction 92. Therefore, the position of the developing unit 4C in the second direction 92 with respect to the developing unit 4B is specified. This makes it possible to improve the accuracy of positions between the plurality of developing units 4A to 4D in the second direction 92.

It should be noted that a configuration in which a fourth projecting portion that is in contact with the extending portion 301C from above is further provided so as to nip the extending portion 301C in the vertical direction and the horizontal direction can also be employed.

As shown in FIG. 11, the receiving portion 303B of the positioning portion according to a second variant embodiment may preferably be constituted of a projecting portion 303B2 that is contact with the extending portion 301C of the developing unit 4C, from one side in the third direction 93.

By causing the third projecting portion 303B2 of the developing unit 4B to be in contact with the extending portion 301C of the developing unit 4C, the projecting portion 303B2 restricts the movement of the extending portion 301C in one direction in the third direction 93. Therefore, the position in the third direction 93 of the developing unit 4C with respect to the developing unit 4B is specified. This also makes it possible to improve the accuracy of positions between the plurality of developing units 4A to 4D in the third direction 93.

In a third to a fifth variant embodiments as shown respectively in FIG. 12A to FIG. 12C, FIG. 13A to FIG. 13C, and FIG. 14A to FIG. 14C, the extending portions 301B and 302B extend from the developing unit 4B toward the developing unit 4C by a predetermined length. The receiving portions 303B and 304B are configured so as to receive the extending portions 301A and 302A of the developing unit 4A, respectively. However, in FIG. 12A to FIG. 12C, FIG. 13A to FIG. 13C, and FIG. 14A to FIG. 14C, the extending portions 302A, 302B, and 304B are not shown.

It is to be noted that the developing unit 4B is arranged at a place other than the opposite ends in the first direction 91, and that the developing unit 4C that is arranged at a place other than the opposite ends and the place of the developing unit 4B is configured in the same manner as the developing unit 4B. The developing unit 4D that is arranged at one end portion is configured in the same manner as the developing unit 4B except that the developing unit 4D has no extending portion, and the developing unit 4A that is arranged at the other end portion is configured in the same manner as the developing unit 4B except that the developing unit 4A has no receiving portion.

In addition, in the following description, while, for convenience of description, the reference signs of the extending portions 301A and 302A and the receiving portions 303B and 304B are used, the same applies to the extending portion and the receiving portion of the other developing units 4A to 4D.

The receiving portions 303B and 304B are recessed portions into which the extending portions 301A and 302A of the developing unit 4A are fitted, respectively. The unit assembly 10 is provided with a plurality of sets of a pair of the extending portions 301A and 302A and the receiving portions 303B and 304B that are in contact with each other.

As shown in FIG. 12A to FIG. 12C, in the third variant embodiment, the extending portions 301A and 302A and the receiving portions 303B and 304B may be configured to have a different mounting position from each other between the sets in each of the developing units 4A to 4D in at least one direction of the second direction 92 or the third direction 93.

As an example, the extending portions 301A and 302A and the receiving portions 303B and 304B may be configured to have a different height between the sets.

The extending portions 301A and 302A and the receiving portions 303B and 304B that are fitted into each other in each set have the same mounting position in each of the developing units 4A to 4D in both directions of the second direction 92 and the third direction 93.

In the configuration of the third variant embodiment, as shown in FIG. 12B, the receiving portions 303B and 304B of the developing unit 4B and the extending portions 301A and 302A of the developing unit 4A are fitted into each other, and, similarly, the receiving portions and the extending portions of the other developing units that are adjacent to each other are fitted into each other, so that the accuracy of positions between the plurality of developing units 4A to 4D can be improved. Moreover, since the extending portion and the receiving portion have a different mounting position from each other between the sets in each of the developing units 4A to 4D, the order of alignment of the plurality of developing units 4A to 4D is specified. Therefore, as shown in FIG. 12C, in a case in which the order of alignment is incorrect, at least one set of the extending portions and the receiving portions cannot be fitted into each other. Accordingly, an error in the order of alignment of the plurality of developing units 4A to 4D can be prevented.

As shown in FIG. 13A to FIG. 13C and FIG. 14A to FIG. 14C, in the fourth variant embodiment and the fifth variant embodiment, the extending portions 301A and 302A and the receiving portions 303B and 304B may be configured to have mutually different shapes between the sets.

Specifically, as shown in FIG. 13A to 13C, in the fourth variant embodiment, between the sets, an amount of extension of the extending portions 301A and 302A and a depth of the receiving portions 303B and 304B may be configured to be different from each other. As shown in FIG. 14A to FIG. 14C, in the fifth variant embodiment, between the sets, the extending portions 301A and 302A and the receiving portions 303B and 304B are configured to have a different diameter, that is, a different size in the second direction 92 and the third direction 93, from each other.

The extending portions 301A and 302A and the receiving portions 303B and 304B that are fitted into each other in each set have the same shape, respectively.

In the configurations of the fourth variant embodiment and the fifth variant embodiment, as shown in FIG. 13B and FIG. 14B, the receiving portions 303B and 304B of the developing unit 4B and the extending portions 301A and 302A of the developing unit 4A are fitted into each other, and, similarly, the receiving portions and the extending portions of the developing units that are adjacent to each other are fitted into each other, so that the accuracy of positions between the plurality of developing units 4A to 4D can be improved.

In addition, since the extending portion and the receiving portion have a different shape from each other between the sets, the order of alignment of the plurality of developing units 4A to 4D is specified. Therefore, as shown in FIG. 13C and FIG. 14C, in a case in which the order of alignment is incorrect, at least one set of the extending portions and the receiving portions cannot be fitted into each other. Accordingly, an error in the order of alignment of the plurality of developing units 4A to 4D can be prevented.

It should be noted that the extending portion and the receiving portion may also be configured to have a different size from each other between the sets.

As shown in FIG. 15, in the unit assembly 10 according to another embodiment, the image forming unit 20 may further be provided with third processing units 400A to 400D in addition to the first processing units 200A to 200D and the developing units 4A to 4D. As an example, in such a configuration, in place of the optical scanning device 3, each of the image forming stations 30A to 30D may be provided with an optical scanning unit, and the third processing units 400A to 400D correspond to the optical scanning unit. The third processing units 400A to 400D each include an exposure member that forms an electrostatic latent image by illuminating light to the photoreceptor drums 1A to 1D that have been charged to a predetermined potential.

The plurality of third processing units 400A to 400D are held by the plurality of developing units 4A to 4D, respectively.

In this configuration, since the third processing units 400A to 400D are held by each of the plurality of developing units 4A to 4D that are positioned accurately with each other, the accuracy of positions between the plurality of third processing units 400A to 400D can be improved. Moreover, the accuracy of positions between the respective first processing units 200A to 200D and the respective developing units 4A to 4D, and the third processing units 400A to 400D can also be improved.

As shown in FIG. 16, the image forming unit 20 can be configured to be provided with one kind of processing units 500A to 500D, the positioning portion, and the link member 80. In this manner, a kind of the processing unit included in the image forming unit 20 is not limited particularly and can be one, two, or more than three kinds, which can achieve effects such that the accuracy of positions between the plurality of processing units can be improved and that the accuracy of positions between the image forming unit 20 that has the plurality of processing units, and the intermediate transfer unit 40 can also be improved.

It is to be noted that the positioning portion can also be configured as a separate body from the developing units 4A to 4D.

Moreover, as a developing unit, in place of the developing units 4A to 4D, in a case of applying other units for forming a toner image, effects such that the accuracy of positions between the plurality of first processing units 200A to 200D can be improved and that the accuracy of positions between the image forming unit 20 that has the plurality of first processing units 200A to 200D, and the intermediate transfer unit 40 can also be improved can be achieved.

The foregoing preferred embodiments are to be considered in all respects as illustrative and not restrictive. The scope of the present invention is defined by the following claims, not by the foregoing preferred embodiments. Further, the scope of the present invention is intended to include the scopes of the claims and all possible changes and modifications within the senses and scopes of equivalents.

REFERENCE SIGNS LIST 1A to 1D Photoreceptor drum
4A to 4D Developing unit (a second processing unit)
10 Unit assembly
20 Image forming unit
30A to 30D Image forming station
40 Intermediate transfer unit
80 Link member
91 First direction
92 Second direction
93 Third direction (insertion and removal direction)
100 Image forming apparatus
110 Apparatus body
200A to 200D First processing unit
201B Shaft portion
202B First contact portion
301A, 301B, 302B, 301C Extending member
303B Receiving portion
305B, 306B Bearing portion
307B Second contact portion
308B, 309B Buffer member
400A to 400D Third processing unit

The invention claimed is:

1. A unit assembly configured to be capable of being inserted into and removed from an apparatus body of an image forming apparatus that performs an electrophotographic image forming process, the unit assembly comprising:
an image forming unit that has:
a plurality of first processing units that each include a first image forming member among a plurality of image forming members that form a developer image;
a plurality of second processing units that each include a second image forming member among the plurality of image forming members and hold the plurality of first processing units, respectively;
a positioning portion that determines mutual relative positions of the plurality of second processing units; and
a link member that links the plurality of second processing units together in a state in which the mutual relative positions of the plurality of second processing units are determined with respect to each other; and
an intermediate transfer unit that bears the developer image formed by the plurality of image forming members and carries the developer image to a position in which the developer image is transferred onto a sheet of paper, the intermediate transfer unit being held by the image forming unit, wherein the second processing units are developing units.

2. The unit assembly according to claim 1, wherein:
the image forming unit further has a plurality of third processing units that each include a third image forming member among the plurality of image forming members; and
the plurality of third processing units are held by the plurality of second processing units, respectively.

3. The unit assembly according to claim 2, wherein the third image forming member is an exposure member that exposes a photoreceptor drum to light to form an electrostatic latent image, the photoreceptor drum being electrostatically charged to a predetermined potential.

4. The unit assembly according to claim 1, wherein:
the link member links the plurality of second processing units together in a state in which the plurality of first processing units are held by the plurality of second processing units, respectively and in which the mutual relative positions of the plurality of second processing units are determined with respect to each other; and
the positioning portion includes:
an extending portion that, in a direction of alignment of the second processing units, extends from a first end portion of each of the second processing units toward a second processing unit that is adjacent to the first end portion; and
a receiving portion that is provided with a second end portion of each of the second processing units and receives the extending portion of a second processing unit that is adjacent to the second end portion.

5. The unit assembly according to claim 4, wherein:
the intermediate transfer unit has an intermediate transfer belt; and
the receiving portion, among three directions that are perpendicular to one another, the three directions including a first direction parallel to the direction of alignment of the second processing units, a second direction perpendicular to a region in which the intermediate transfer belt faces the image forming unit, and a third direction parallel to an insertion and removal direction of the unit assembly, restricts movement of the extending portion in at least the first direction.

6. The unit assembly according to claim 5, wherein the receiving portion includes a projecting portion that is in contact with the extending portion of the second processing unit that is adjacent to the second end portion, from at least one side in the second direction.

7. The unit assembly according to claim 4, wherein:
the receiving portion is a recessed portion into which the extending portion of the second processing unit that is adjacent to the second end portion is fitted;
the unit assembly further comprises a plurality of sets of a pair of the extending portion and the receiving portion that are in contact with each other; and
in a case in which three directions that are perpendicular to one another are set as a first direction parallel to the direction of alignment of the second processing units, a second direction perpendicular to a region in which the intermediate transfer belt faces the image forming unit, and a third direction parallel to an insertion and removal direction of the unit assembly, the extending portion and the receiving portion have a different mounting position in each of the second processing units in at least one direction of the second direction or the third direction, from each other between the sets.

8. The unit assembly according to claim 1, wherein the first image forming member is a photoreceptor drum.

9. An image forming apparatus comprising the unit assembly according to claim 1.

10. The unit assembly according to claim 1, wherein a first linked portion linked by the link member of each of the plurality of first processing units and a second linked portion linked by the link member of each of the plurality of second processing units are arranged in a straight line.

11. The unit assembly according to claim 10, wherein the first linked portion and the second linked portion are alternately arranged.

12. The unit assembly according to claim 1, wherein the plurality of second processing units use a common washer to link with the link member.

13. A unit assembly configured to be capable of being inserted into and removed from an apparatus body of an image forming apparatus that performs an electrophotographic image forming process, the unit assembly comprising:
an image forming unit that has:
a plurality of first processing units that each include a first image forming member among a plurality of image forming members that form a developer image;
a plurality of second processing units that each include a second image forming member among the plurality of image forming members and hold the plurality of first processing units, respectively;
a positioning portion that determines mutual relative positions of the plurality of second processing units; and
a link member that links the plurality of second processing units together in a state in which the mutual relative positions of the plurality of second processing units are determined with respect to each other; and
an intermediate transfer unit that bears the developer image formed by the plurality of image forming members and carries the developer image to a position in which the developer image is transferred onto a sheet of paper, the intermediate transfer unit being held by the image forming unit, wherein:
the link member links the plurality of second processing units together in a state in which the plurality of first processing units are held by the plurality of second processing units, respectively and in which the mutual relative positions of the plurality of second processing units are determined with respect to each other;
the positioning portion includes:
an extending portion that, in a direction of alignment of the second processing units, extends from a first end portion of each of the second processing units toward a second processing unit that is adjacent to the first end portion; and
a receiving portion that is provided with a second end portion of each of the second processing units and receives the extending portion of a second processing unit that is adjacent to the second end portion, the intermediate transfer unit has an intermediate transfer belt; and
the receiving portion, among three directions that are perpendicular to one another, the three directions including a first direction parallel to the direction of alignment of the second processing units, a second direction perpendicular to a region in which the intermediate transfer belt faces the image forming unit, and a third direction parallel to an insertion and removal direction of the unit assembly, restricts movement of the extending portion in at least the first direction, and includes a first projecting portion that is in contact with the extending portion of the second processing unit that is adjacent to the second end portion, from one side in the third direction.

14. The unit assembly according to claim 13, wherein the receiving portion further includes a second projecting portion that is in contact with the extending portion of the second processing unit that is adjacent to the second end portion, from another side in the third direction.

15. An image forming apparatus comprising the unit assembly according to claim 13.

16. A unit assembly configured to be capable of being inserted into and removed from an apparatus body of an image forming apparatus that performs an electrophotographic image forming process, the unit assembly comprising:
an image forming unit that has:
a plurality of first processing units that each include a first image forming member among a plurality of image forming members that form a developer image;
a plurality of second processing units that each include a second image forming member among the plurality of image forming members and hold the plurality of first processing units, respectively;
a positioning portion that determines mutual relative positions of the plurality of second processing units; and
a link member that links the plurality of second processing units together in a state in which the mutual relative positions of the plurality of second processing units are determined with respect to each other; and
an intermediate transfer unit that bears the developer image formed by the plurality of image forming members and carries the developer image to a position in which the developer image is transferred onto a sheet of paper, the intermediate transfer unit being held by the image forming unit, wherein:
the link member links the plurality of second processing units together in a state in which the plurality of first processing units are held by the plurality of second processing units, respectively and in which the mutual relative positions of the plurality of second processing units are determined with respect to each other; and
the positioning portion includes:
an extending portion that, in a direction of alignment of the second processing units, extends from a first end portion of each of the second processing units toward a second processing unit that is adjacent to the first end portion; and
a receiving portion that is provided with a second end portion of each of the second processing units and receives the extending portion of a second processing unit that is adjacent to the second end portion;
the receiving portion is a recessed portion into which the extending portion of the second processing unit that is adjacent to the second end portion is fitted;
the unit assembly further comprises a plurality of sets of a pair of the extending portion and the receiving portion that are fitted into each other; and
the extending portion and the receiving portion have a different shape from each other between the sets.

17. An image forming apparatus comprising the unit assembly according to claim 16.

18. A unit assembly configured to be capable of being inserted into and removed from an apparatus body of an image forming apparatus that performs an electrophotographic image forming process, the unit assembly comprising:
an image forming unit that has:
a plurality of first processing units that each include a first image forming member among a plurality of image forming members that form a developer image;
a plurality of second processing units that each include a second image forming member among the plurality of image forming members and hold the plurality of first processing units, respectively;
a positioning portion that determines mutual relative positions of the plurality of second processing units; and
a link member that links the plurality of second processing units together in a state in which the mutual relative positions of the plurality of second processing units are determined with respect to each other; and
an intermediate transfer unit that bears the developer image formed by the plurality of image forming members and carries the developer image to a position in which the developer image is transferred onto a sheet of paper, the intermediate transfer unit being held by the image forming unit, wherein:
the link member links the plurality of second processing units together in a state in which the plurality of first processing units are held by the plurality of second processing units, respectively and in which the mutual relative positions of the plurality of second processing units are determined with respect to each other; and
the positioning portion includes:
an extending portion that, in a direction of alignment of the second processing units, extends from a first end portion of each of the second processing units toward a second processing unit that is adjacent to the first end portion; and
a receiving portion that is provided with a second end portion of each of the second processing units and receives the extending portion of a second processing unit that is adjacent to the second end portion, and
the receiving portion is a recessed portion into which the extending portion of the second processing unit that is adjacent to the second end portion is fitted;
the unit assembly further comprises a plurality of sets of a pair of the extending portion and the receiving portion that are fitted into each other; and
the extending portion and the receiving portion have a different size from each other between the sets.

19. An image forming apparatus comprising the unit assembly according to claim 18.

20. A unit assembly configured to be capable of being inserted into and removed from an apparatus body of an image forming apparatus that performs an electrophotographic image forming process, the unit assembly comprising:
an image forming unit that has:
a plurality of first processing units that each include a first image forming member among a plurality of image forming members that form a developer image;
a plurality of second processing units that each include a second image forming member among the plurality of image forming members and hold the plurality of first processing units, respectively;
a positioning portion that determines mutual relative positions of the plurality of second processing units; and
a link member that links the plurality of second processing units together in a state in which the mutual relative positions of the plurality of second processing units are determined with respect to each other; and
an intermediate transfer unit that bears the developer image formed by the plurality of image forming members and carries the developer image to a position in which the developer image is transferred onto a sheet of paper, the intermediate transfer unit being held by the image forming unit, wherein:
the link member links the plurality of second processing units together in a state in which the plurality of first processing units are held by the plurality of second processing units, respectively and in which the mutual relative positions of the plurality of second processing units are determined with respect to each other;
the first processing units each have:
a shaft portion that extends in an insertion and removal direction of the unit assembly and is provided on a bottom portion of the first processing units; and
a predetermined first contact portion that is spaced away from the shaft portion;
the second processing units each have:
a bearing portion that rotatably bears the shaft portion; and
a predetermined second contact portion; and
the first processing units are configured to cause the first contact portion to be in contact with the second contact portion by rotating the shaft portion in a state of being supported by the bearing portion.

21. The unit assembly according to claim 20, wherein the second processing units each have a buffer member on the second contact portion.

22. The unit assembly according to claim 20, wherein the second processing units are configured to be positioned so that a center of gravity in a cross section perpendicular to the insertion and removal direction is positioned below a center in a height direction.

23. The unit assembly according to claim 20, wherein:
the positioning portion includes an extending portion that, in a direction of alignment of the second processing units, extends from an end portion of each of the second processing units toward a second processing unit that is adjacent to the end portion; and the bearing portion is provided on the extending portion.

24. An image forming apparatus comprising the unit assembly according to claim 20.

\* \* \* \* \*